United States Patent [19]

MacKay

[11] 4,052,567
[45] * Oct. 4, 1977

[54] MULTIPLEXER RECEIVER TERMINATOR

[75] Inventor: William Allan MacKay, Richmond Hill, Canada

[73] Assignee: D.D.I. Communications, Inc.

[*] Notice: The portion of the term of this patent subsequent to Oct. 4, 1994, has been disclaimed.

[21] Appl. No.: 644,102

[22] Filed: Dec. 24, 1975

[51] Int. Cl.² .............................................. H04J 3/08
[52] U.S. Cl. ............................. 179/15 AL; 179/15 A
[58] Field of Search .......... 179/15 AL, 15 BA, 15 A, 179/15 R, 18 FC; 307/234

[56] References Cited

U.S. PATENT DOCUMENTS

| | | | |
|---|---|---|---|
| 3,588,365 | 6/1971 | McNeilly | 179/15 AL |
| 3,723,658 | 3/1973 | Huebner | 179/15 R |
| 3,737,677 | 6/1973 | Huebner | 307/234 |
| 3,757,050 | 9/1973 | Mizote | 179/15 AL |
| 3,804,986 | 4/1974 | Wakamatsu | 179/15 AL |
| 3,814,861 | 6/1974 | Robbins | 179/15 A |
| 3,870,825 | 3/1975 | Roberts | 179/15 AL |

Primary Examiner—David L. Stewart
Attorney, Agent, or Firm—Woodling, Krost, Granger & Rust

[57] ABSTRACT

A multiplexer receiver terminator is disclosed for connection to a multiplexer receiver in a system having a plurality of multiplexer receivers connected on a common communication line. Each of the multiplexer receivers is assigned a time period for reception relative to a multiplexer time clock. The improvement includes a counter circuit connected to the multiplexer time clock for providing a counter output upon the clock counter counting between two preselected clock counts which correspond to the time period assigned for reception of the multiplexer receiver. A line receiver is connected to the communication line for providing an output upon detecting a predetermined period of signal absence on the communication line. The line receiver output is connected to the counter for resetting the counter after the predetermined period of signal absence. The counter circuit is connected to the multiplexer receiver for enabling reception from the communication line only during an output of the counter circuit. The foregoing abstract is merely a resume of one general application, is not a complete discussion of all principles of operation or applications, and is not to be construed as a limitation on the scope of the claimed subject matter.

14 Claims, 2 Drawing Figures

MULTIPLEXER RECEIVER TERMINATOR

BACKGROUND OF THE INVENTION

1. Field of the Invention

The invention relates to Telephony, Systems, multiplexed.

2. Description of the Prior Art

Various types of multiplexer systems have been known to the prior art for many years. In one type of multiplexer system, information on a plurality of terminals is serially transmitted relative to a multiplexer time clock through a communication line. The multiplexer transmitter and multiplexer receiver are each synchronized with the multiplexer time clock to enable the transmission of plural information on a single communication line over a given time period.

There have been many novel systems to extend the amount of information which could be handled by a single communication line. Of prime importance is to easily extend the number of information terminals of the transmitter and the receiver without rewiring the multiplexer system. For example, U.S. Pat. Nos. 3,691,304; 3,691,305; 3,723,658; and 3,737,677 disclose an extendable multiplexing system, wherein the number of multiplexer channels can be increased without rewiring the multiplexer system. However, the aforementioned improvements in the art restrict all of the transmitter or receiver units to be in a single location. Sometimes it is desirable to have several transmitters being remote from one another and connected through a communication line to several receivers which are remote from one another. The prior art has not provided a system which is readily adaptable to existing multiplexer systems to connect a plurality of transmitters, each of which may be remote from one another, to one end of a communication line for information transfer to a plurality of receivers on the other end of the communication line which receivers may be remote from one another. Such a system for expanding the number of transmitters and receivers on a communication line must be compatable with existing equipment in order to avoid reinstallation of the multiplexer system when additional units are desired.

Therefore an object of this invention is to provide a multiplexer receiver terminator for connecting with a multiplexer receiver on a communication line having a plurality of multiplexer receivers which will connect and activate the multiplexer receiver only at a specific time designated for operation of the multiplexer receiver.

Another object of this invention is to provide a multiplexer receiver terminator for connection with a multiplexer receiver which resets the receiver terminator upon completion of transmission of all transmitters connected to the communication line.

Another object of this invention is to provide a multiplexer receiver terminator for connection with a multiplexer receiver which may be easily programed for use in any time sequence of the plurality of multiplexer receivers on the communication line.

Another object of this invention is to provide a multiplexer receiver terminator for connection with a multiplexer receiver which is easily connected to existing multiplexer receivers.

Another object of this invention is to provide a multiplexer receiver terminator for connection with a multiplexer receiver which is theoretically capable of operating with an unlimited number of multiplexer receivers.

SUMMARY OF THE INVENTION

The invention may be incorporated into a device for a multiplexer receiver in a system having a plurality of multiplexer receivers connected on a common communication line wherein each multiplexer receiver has a time period for reception relative to a multiplexer time clock, comprising, in combination: a counter circuit connected to the multiplexer time clock for providing a counter output upon registering a clock count between two preselected clock counts which correspond to the time period of the multiplexer receiver; a line receiver connected to the communication line for providing a line receiver output detecting a predetermined period of signal absence on the communication line; means connecting said line receiver output to said counter circuit for resetting said counter circuit after said predetermined period of signal absence; and means connecting said counter circuit output to the multiplexer receiver for enabling reception from the communication line only during a counter output of said counter circuit.

Other objects and a fuller understanding of the invention may be had by referring to the following description and claims, taken in conjunction with accompanying drawing.

DESCRIPTION OF THE PREFERRED EMBODIMENT

Figure 1:
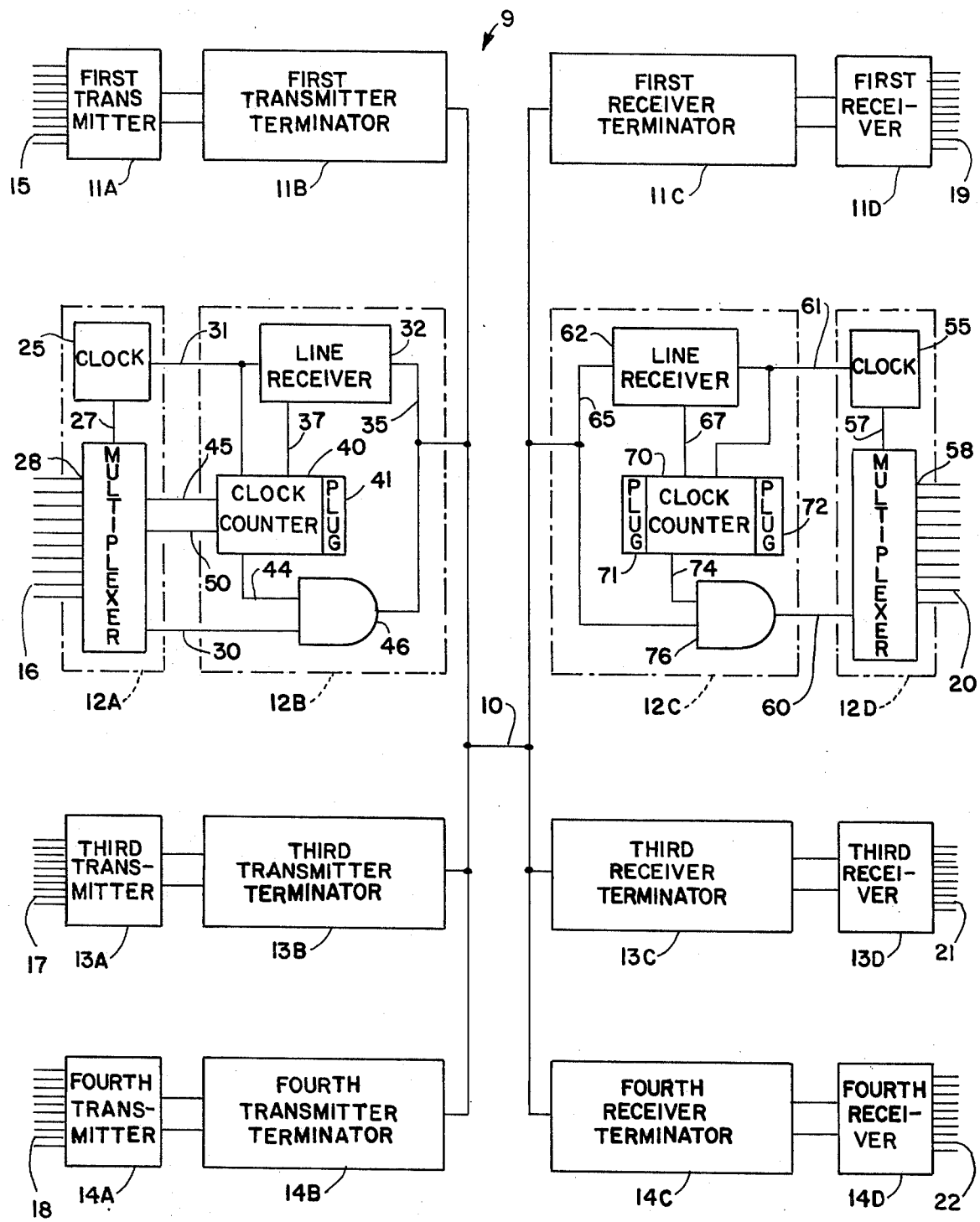
FIG. 1 is a block diagram of a multiplexer system having a plurality of multiplexer transmitters connected to one end of a communication line by a plurality of transmitter terminators with a plurality of multiplexer receivers connected to the other end of the communication line by a plurality of receiver terminators.

FIG. 1 is a block diagram of a multiplexer system 9 having a communication line 10 with first through fourth transmitters 11A–14A connected through first through fourth transmitter terminators 11B–14B to one end of the communication line 10 with first through fourth receiver terminators 11C–14C interconnecting the other end of communication line 10 with multiplexer receivers 11D–14D; respectively. Each of the transmitters 11A–14A are substantially identical each having a plurality of multiplexer inputs 15–18 respectively, whereas each of the receivers 11D–14D are substantially identical each having a plurality of multiplexer outputs 19–22, respectively. The inputs 15–18 correspond with the outputs 19–22 forming four transmitter-receiver units 11–14. In the prior art, a single transmitter for example 12A was directly connected by the communication line 10 to receiver 12D whereby the information on the inputs 16 was sequentially transferred through the communication line 10 to outputs 20 of the receiver 12D.

The second unit comprising transmitter 12A, transmitter terminator 12B, receiver terminator 12C, and receiver 12D has been expanded in size to show the internal circuits but it is understood that the same circuits exists in the remaining units 11, 13 and 14. The transmitter 12A comprises a multiplexer time clock 25 which is connected by a connector 27 to a multiplexer 28 to transfer the information on the inputs 16 sequentially in time on an output connector 30 of the multiplexer 28. The clock 25 regulates the time of transfer for each one of the plurality of inputs 16. The transmitter terminator 12B includes a line receiver 32 which is connected to the clock 25 by a connector 31 and is also connected by a connector 35 to the communication line 10 to provide an output on connector 37 when the line receiver detects an absence of signal on the communication line 10 for a predetermined period of time. The connector 37 is connected to a reset terminal of a counter 40 which counter is connected by the connector 31 to count the clock pulses of the clock 25 in the transmitter 12A. A program plug 41 is connected to the counter 40 to provide counter outputs on connectors 44 and 45 when the counter 40 counts the predetermined number of clock pulses from clock 25 determined by the program plug 41. The output 44 of the counter 40 enables gate 46 to pass signals from the output connector 30 of multiplexer 28 to the communication line 10. The output 45 of counter 40 activates the transmitter 12A to begin transmission on connector 30. A connector 50 interconnects the multiplexer 28 and the counter 40 to terminate the counter output on connector 44 to disenable gate 46 after the transmitter 12A has transmitted the information on inputs 16.

Figure 2:
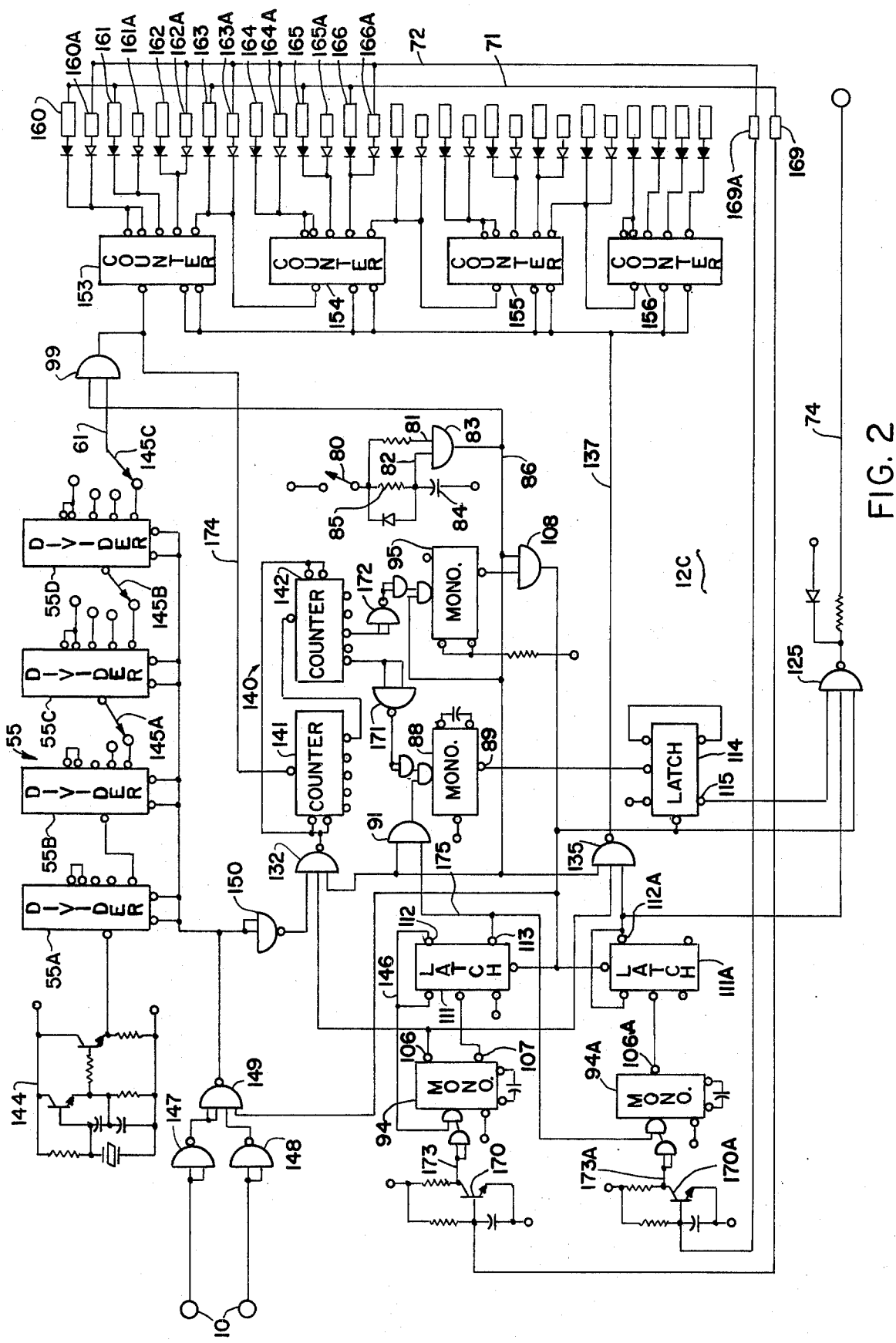
FIG. 2 is a schematic diagram of the receiver terminator shown in FIG. 1.

The receiver 12D comprises a multiplexer time clock 55 which is connected by connector 57 to a multiplexer 58 to separate the sequential information received on connector 60 to correspond the inputs 16 with the outputs 20. The receiver 12D is connected to the receiver terminator 12C which receiver terminator includes a line receiver 62 which is connected to the clock 55 by a connector 61 and is also connected by a connector 65 to the communication line 10 to provide a line receiver output on connector 67 when the line receiver detects an absence of signal on the communication line 10 for a predetermined period of time. The connector 67 is connected to a reset terminal of a counter 70 which counter is connected by the connector 61 to count the clock pulses of the clock 55 in the receiver 12D. The clock 55 may be included in the receiver 12D as shown in FIG. 1 or may be a separate clock in the receiver terminator 12C as shown in FIG. 2. A first and a second programmable plug 71 and 72 are connected to the counter 70 to provide a counter output on connector 74 when counter 70 counts a first predetermined number of clock pulses from clock 55 determined by the first plug 71. The output on connector 74 is terminated when the counter 70 counts a second predetermined number of clock pulses determined by the second plug 72. A gate 76 transfers information from the communication line 10 to the input 60 of the multiplexer 58 when an output exists on connector 74 from the counter 70.

In the multiplexer system 9, each unit 11–14 is assigned a specific time period in which to transfer information from the inputs 15–18 to the outputs 19–22, respectively. For example, the first transmitter 11A and first receiver 11D may be assigned from 1 to 100 pulses whereas the second transmitter 12A and second receiver 12D may be assigned from 101 to 200 pulses whereas the third transmitter 13A and third receiver 13D may be assigned from 201 to 300 pulses and accordingly the fourth transmitter 14A and receiver 14D from 301 to 400 pulses. The assigned time period is programed into the transmitter terminator 12B by programmable plug 41 and is programed into receiver terminator 12C by programmable plugs 71 and 72. The assigned time periods are dependent upon the clock rate and the number of inputs to each multiplexer transmitter so the aforementioned times are only by way of example. It is also evident that a substantially unlimited number of transmitters and receivers may be incorporated into the system.

Upon applying power to the system 9 there will be an absence of signal on the communication line 10. The line receivers in the transmitter terminators 11B–14B and the receiver terminators 11C–14C including line receivers 32 and 62 will detect a predetermined period of signal absence on the communication line 10 and reset the counters in the transmitter and receiver terminators including counters 40 and 70. All counter commence counting and at the count of 001 pulses the counters in terminators 11B and 11C interconnect transmitter 11A to receiver 11D. The information from inputs 15 is transferred to outputs 19. The counters in terminators 11B and 11C disconnect transmitter 11A from receiver 11D at the count of 100 pulses. At count 101 pulses, counters 40 and 70 provide outputs on connectors 44 and 74 to enable gates 46 and 76. The counter output on connector 45 activates transmitter 12A to begin the sequential transmission of information on the inputs 16 through gate 46, communication line 10 and gate 76 to the outputs 20. The multiplexer 58 arranges the information on the outputs 20 to respectively correspond to the inputs 16 as well known to the art. When transmitter 12A completes transmission, a signal is transferred through connector 50 to the counter 40 to terminate the output on connector 44 to disenable gate 46. The preprogramed second programmable plug 72 connected to counter 70 terminates the counter output on connector 74 at count 200 pulses to disenable gate 76 and thereby disconnects the multiplexer receiver 12D from the communication line 10. The programming of plugs 41 and 71 must correspond to the beginning of the communication period whereas the programming of plug 72 must correspond to the termination of the communication period. Upon the count of 201 pulses, terminators 13B and 13C will connect transmitter 13A to receiver 13D. The connection will be terminated at 300 pulses and upon the count of 301 transmitter 14A will be connected to receiver 14D by their respective terminators 14B and 14C. After transmitter 14A has completed transmission and the transmitter and the receiver 14A and 14D have been disconnected the communication line 10 is silent. Passing of a predetermined period of time results in the line receivers resetting the terminator counters to begin the interconnection of the units 11–14 as heretofore described.

The foregoing description was for example only and in actual practice the connection and disconnection of the transmitters and receivers are more complex as will be hereinafter described. Units have been constructed in which a period of silence of 32 counts will reset all line receivers. All terminators begin counting from time 000 but the receiver terminator counters provide an output 6 counts after the transmitter terminator counters. This is due to an 8 count delay existing in the transmitters as described in the aforementioned U.S. Pat. Nos. 3,691,304; 3,691,305; 3,723,658; 3,737,677 which are owned by the assignee of the instant invention and are hereby incorporated by reference into this disclosure.

FIG. 2 is a schematic diagram of a portion of the receiver terminator 12C shown in FIG. 1. When power is applied to the receiver terminator 12C by switch 80, input 81 of AND gate 83 is in a high bistable condition (HIGH) whereas input 82 is in a low bistable condition (LOW). The LOW output of AND gate 83 on line 86 disenables monostable 95 and through AND gate 91 disenables monostable 88 and is applied to AND gate 99 for blocking signals on connector 61 from the clock 55. The LOW on line 86 is applied through NAND gate 135 along connector 137 to reset the counter units 153-156 and also resets a pause counter 140 including counter units 141 and 142 through NAND gate 132. Through an AND gate 108, the LOW on line 86 resets latches 111, 111A and 114 in addition to holding an input of NAND gates 125 and 149 LOW. Capacitor 84 continues to charge through resistor 85 and eventually provides a HIGH to input 82 making the output of AND gate 83 HIGH. The HIGH on line 86 enables counting of the clock pulses from clock 55 by the counter units 153-156 and the circuit commences operation. This power-on circuit functions only when power is first applied to the system.

The output from the multiplexer clock 55 on connector 61 is applied through AND gate 99 to the counter units 153-156 which are interconnected to provide binary outputs along the binary terminals some of which are shown as 160-166 and 160A-166A. The clock 55 is shown in FIG. 1 to be in the receiver 12D whereas the clock 55 is shown in FIG. 2 to be in the receiver terminator. Either structure can be used with the invention. The clock 55 includes an oscillator 144 connected to a series of dividers 55A-55D by means including switches 145A, 145B and 145C. The switches 145A-145C control the final pulse rate per time of the counter 55. NAND gates 149 is connected to the reset of dividers 55A-55D to synchronize the clock pulses with the signals on the communication line 10. The programmable plugs 71 and 72 comprise jumper wires in a multiple connector plug which connect selective ones of terminals 160-166 and 160A-166A.

For example receiver 12D is selected to start receiving 6 pulses after the transmitter is reset by the transmitter terminator 12B. The 6 pulse delay is due to an 8 pulse delay incorporated into each transmitter between the reset and the start of transmission. Consequently, the first programmable plug 71 is programed to provide a first output at 107 pulses. The program plug 71 connects terminals 160 ($2^0$); 161 ($2^1$); 163 ($2^3$); 165 ($2^5$) and 166 ($2^6$) through plug 169 to the base of the transistor 170. The second programmable plug 72 is programed to provide an output at 200 pulses or 93 pulses after the first output at 107 pulses. The second program plug 72 connects terminals 106A ($2^0$); 162A ($2^2$); 163A ($2^3$); 164A ($2^4$) and 166A ($2^6$) through connector plug 169A to transistor 170A. When the counter units 153-156 receive 107 pulses, terminals 160, 161, 163, 165, and 166 will be HIGH activating transister 170. Transistor 170 connects and inverts the signal from the terminal 169 and connects the inverted signal to a first clock monostable 94 by connector 173. The clock monostable provides a LOW on first output 106 to NAND gate 132 to reset the pause counter 140 and is also applied through NAND gate 135 and connector 137 to reset counter units 153-156. The counter units 153-156 again begin counting from zero to provide a second output in accordance with the second program plug 72.

The pause counter 140 counts clock pulses on connector 174. The second counter unit 142 provides a first counter output a HIGH to NAND gate 171, upon the second counter unit 142 counting a first predetermined number of pulses, for example 16 pulses, whereas the second counter unit 142 provides a second counter output, a HIGH to NAND gate 172, upon counting a second predetermined number of pulses, for example 32 pulses. A second output 107 of clock monostable 94 which second output is delayed in time from the first output 106 is applied to a clock latch circuit 111 which provides a HIGH output 113 along connector 175 to cause a HIGH output of AND gate 91 to enable the pause monostable 88. Since the pause monostable 88 is enabled by AND gate 91 after the pause counter 140 is reset, there is no chance that spurious outputs from the counter 140 will activate monostable 88. The LOW on latch output 112 is applied by a connector 146 to disenable monostable 94 whereas the HIGH on output 113 is applied to enable monostable 94A. The monostables 94 and 94A and latches 111 and 111A are interconnected such that only one of the monostables 94 and 94A is sensitive to an input thereto. The pause monostable 88 will activate upon the first HIGH output from the counter 140 to NAND gate 171 thus applying a LOW to the pause monostable 88. The output 89 of monostable 88 is applied to toggle a latch circuit 114 providing a HIGH latch output 115 to an input to NAND gate 125. The other inputs to NAND gate 125 are HIGH which results in the output of NAND gate 125 going LOW. The output of NAND gate 125 is connected through connector 74 to enable the receiver 12D to receive information from transmitter 12A. The gate 76 in FIG. 1 may be incorporated into the receiver terminal 12C or may be an existing gate in the receiver 12D. Two counts latter the transmitter begins to transmit since the receiver is programed to energize 6 pulses after the transmitter but the transmitter has a delay of 8 counts.

The transmitter 12A makes one complete transmission and terminates signal transfer. A signal on connector 50 from transmitter 12A immediately after termination of signal transfer activates transmitter terminator 12B to disconnect transmitter 12A from the communication line 10. The counter units 153-156 reach the count of 93 pulses 8 counts after termination of signal transfer and produce a HIGH on terminals 160A, 162A, 163A, 164A and 166A. The HIGH output is transferred through connector 169A to the input of transistor 170A which activates the second clock monostable 94A by connector 173A to produce output 106A which toggles latch 111A. The LOW output 112A of latch 111A freezes and resets the counter units 153-156 through NAND gate 135 and connector 137. The LOW output 112A is also applied to NAND gate 125 to cause a HIGH on connector 74 to disenable the receiver.

NAND gates 147, 148, 149 and 150 connect the communication line 10 to NAND 132 for resetting the pause counter 140. The counter 140 is constantly being reset during signal transfer on the communication line 10. After transmission by the fourth transmitter 14A, the communication line 10 is silent and counter 140 is allowed to count and provide a second pause counter HIGH output through NAND gate 172 on counting a second predetermined number of pulses for example at 32 pulses to trigger the monostable 95. The output of monostable 95 applies a LOW to AND gate 108 to reset latches 111 and 111A and to disenable the counters 141, 142, 153-156 through NAND gates 132 and 135. AND gate 108 also provides a LOW input to NAND gate 125 to insure that the receiver 12D remains disenabled during the resetting of the latches masking any transitions which may occur. After the output pulse of monostable 95 has terminated, the counters 141, 142, 153-156 begin to count.

The transmitter of the invention is constructed similarly to the receiver but requires only one counter monostable and counter latch circuit since the transmitter generates a signal upon termination of transmission. A complete description of the transmitter may be found in my copending application filed concurrently herewith and is hereby incorporated by reference in the instant disclosure.

The invention has been described as a device for a multiplexer receiver having a plurality of multiplexer receivers connected on a common communication line 10 wherein each multiplexer receiver is assigned a time period for reception relative to a multiplexer time clock. A counter circuit is connected to a multiplexer time clock providing a counter output upon registering a count between two preselected clock counts which correspond to the time period assigned to the multiplexer receiver. A line receiver is connected to the communication line 10 for providing a line receiver output upon detecting a predetermined period of signal absence on the communication line 10. The line receiver output is connected to the counter circuit after the predetermined period of signal absence. The counter circuit is connected to the multiplexer receiver for enabling reception from the communication line only during the output of said counter circuit.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

I claim:

1. A device for a multiplexer receiver in a system having a plurality of multiplexer receivers connected on a common communication line wherein each multiplexer receiver has a time period for reception relative to a multiplexer time clock, comprising in combination:
    a counter circuit connected to the multiplexer time clock for providing a counter output upon registering a clock count between two preselected clock counts which correspond to the time period of the multiplexer receiver;
    a line receiver connected to the communication line for providing a line receiver output upon detecting a predetermined period of signal absence on the communication line;
    means connecting said line receiver output to said counter circuit for resetting said counter circuit after said predetermined period of signal absence;
    and means connecting said counter circuit output to the multiplexer receiver for enabling reception from the communication line only during a counter output of said counter circuit.

2. A device as set forth in claim 1, wherein said means connecting said counter circuit to the multiplexer receiver includes means for enabling the multiplexer receiver a predetermined time after said counter output.

3. A device as set forth in claim 1, wherein said line receiver includes a pause counter having a reset input; means connecting said pause counter to the multiplexer time clock for providing said line receiver output upon counting a given number of clock counts;
    and means connecting said reset input to the communication line for resetting said pause counter when a signal occurs on the communication line.

4. A device as set forth in claim 1, including means for deactivating the device for a given duration immediately after operating power is applied.

5. A device as set forth in claim 1, wherein said means connecting said counter circuit to the multiplexer receiver includes a counter monostable providing a first and a second output sequentially in time upon a counter output;
    a pause counter connected to the multiplexer time clock for providing a pause counter output upon counting a given number of clock counts;
    a gate connected between said pause counter and the multiplexer receiver;
    means connecting said first output of said counter monostable to initiate counting by said pause counter;
    and means connecting said second output of said counter monostable for enabling said gate to transfer said pause counter output to the multiplexer receiver.

6. A device as set forth in claim 1 including means for varying said preselected clock counts to correspond to a specific time period assigned to the multiplexer receiver.

7. A device as set forth in claim 6, wherein said means for varying said preselected clock count includes said clock counter having a plurality of outputs with the combination thereof providing a numerical output of the count of the counter;
    and means for connecting selected ones of said plurality of clock counter outputs to provide said counter output when a common signal exists on said selected outputs.

8. A device as set forth in claim 1, including means for visually indicating the transfer of information on the communication line by the multiplexer.

9. A device for a multiplexer receiver which receives plural information in a system having a plurality of multiplexer receivers on a common communication line wherein each multiplexer receiver is assigned a time period for reception relative to a multiplexer time clock, comprising in combination:
    a clock counter connected to the multiplexer time clock for providing a counter output upon registering a clock count between a first and a second preselected clock counts which correspond to the time period assigned to the multiplexer receiver;
    means for varying said preselected clock counts of said counter circuit to correspond to the time period assigned to the multiplexer receiver;
    a line receiver connected to the communication line for providing a line receiver output upon detecting a predetermined period of signal absence on said communication line;
    means connecting said line receiver output to said counter circuit for resetting said counter circuit after said predetermined period of signal absence;
    means connecting said counter circuit to the multiplexer receiver for enabling reception of the plural information from the communication line upon said clock counter counting said first preselected clock count;

and means for disenabling reception of the plural information from the communication line upon said clock counter counting said second preselected clock count.

10. A device as set forth in claim 9, wherein said counter provides a first clock counter output upon counting said first preselected clock count;

means connecting said first clock counter output for resetting said clock counter;

and said counter providing a second clock counter output upon counting said second preselected clock count.

11. A device as set forth in claim 10, wherein said means connecting said counter circuit to the multiplexer receiver includes a first and a second clock latch circuit;

said first clock latch circuit enabling reception by the multiplexer receiver upon receiving said first clock counter output of said clock counter;

said second clock latch circuit disenabling reception by the multiplexer receiver upon receiving said second clock counter output of said clock counter;

and means interconnecting said first and second clock latch circuit for providing alternating operation between said first and second clock latch circuits.

12. A device as set forth in claim 9, wherein said means connecting said counter circuit to the multiplexer receiver includes gate means.

13. A device for connection to one of a plurality of multiplexer receivers on a communication line wherein each multiplexer receiver is assigned a unique reception period relative to a multiplexer clock generating clock pulses, comprising in combination:

a programmable clock counter connected to the multiplexer clock for providing a first and a second clock counter output upon counting a first and a second preprogrammed number of multiplexer clock pulses which correspond to the beginning and the end of the unique reception period, respectively;

means connecting said clock counter for initiating reception of the multiplexer receiver on the communication line upon said programmable counter counting said first preprogrammed number of clock pulses;

means connecting said clock counter for terminating reception of the multiplexer receiver on the communication line upon said programmable counter counting said second preprogramed number of clock pulses;

and means initiating said clock counter to count said preprogramed number of clock pulses upon silence existing on the communication line for a predetermined period.

14. A device for a multiplexer receiver which receives plural information on a communication line having a plurality of multiplexer receivers connected thereto wherein each multiplexer receiver is assigned a specific time period for reception relative to a multiplexer time clock generating clock pulses, comprising in combination:

a programmable clock counter connected to the multiplexer time clock for providing a first clock counter output upon counting a first preprogramed number of clock pulses which corresponds to the beginning of the specific time period assigned to the multiplexer receiver;

said clock counter providing a second clock counter output upon counting a second preprogramed number of clock pulses which corresponds to the end of the specific time period assigned to the multiplexer receiver;

a pause counter connected to the multiplexer time clock for providing a first and a second pause output upon counting a first and a second preselected number of clock pulses, respectively;

means connecting said first output of said clock counter to said pause counter to commence counting of said first preselected number of clock pulses;

means connecting said first pause counter output for enabling the multiplexer receiver to initiate reception of the plural information on the communication line;

means connecting said second output of said clock counter for disenabling the receiver to terminate reception of the plural information on the communication line;

means connecting said pause counter to the communication line for providing said second pause output upon a silence existing on the communication line exceeding said second preselected number of multiplexer clock pulses;

and means connecting said pause counter to said clock counter for initiating counting of said clock counter upon said second pause output.

* * * * *